United States Patent Office 2,983,310
Patented May 9, 1961

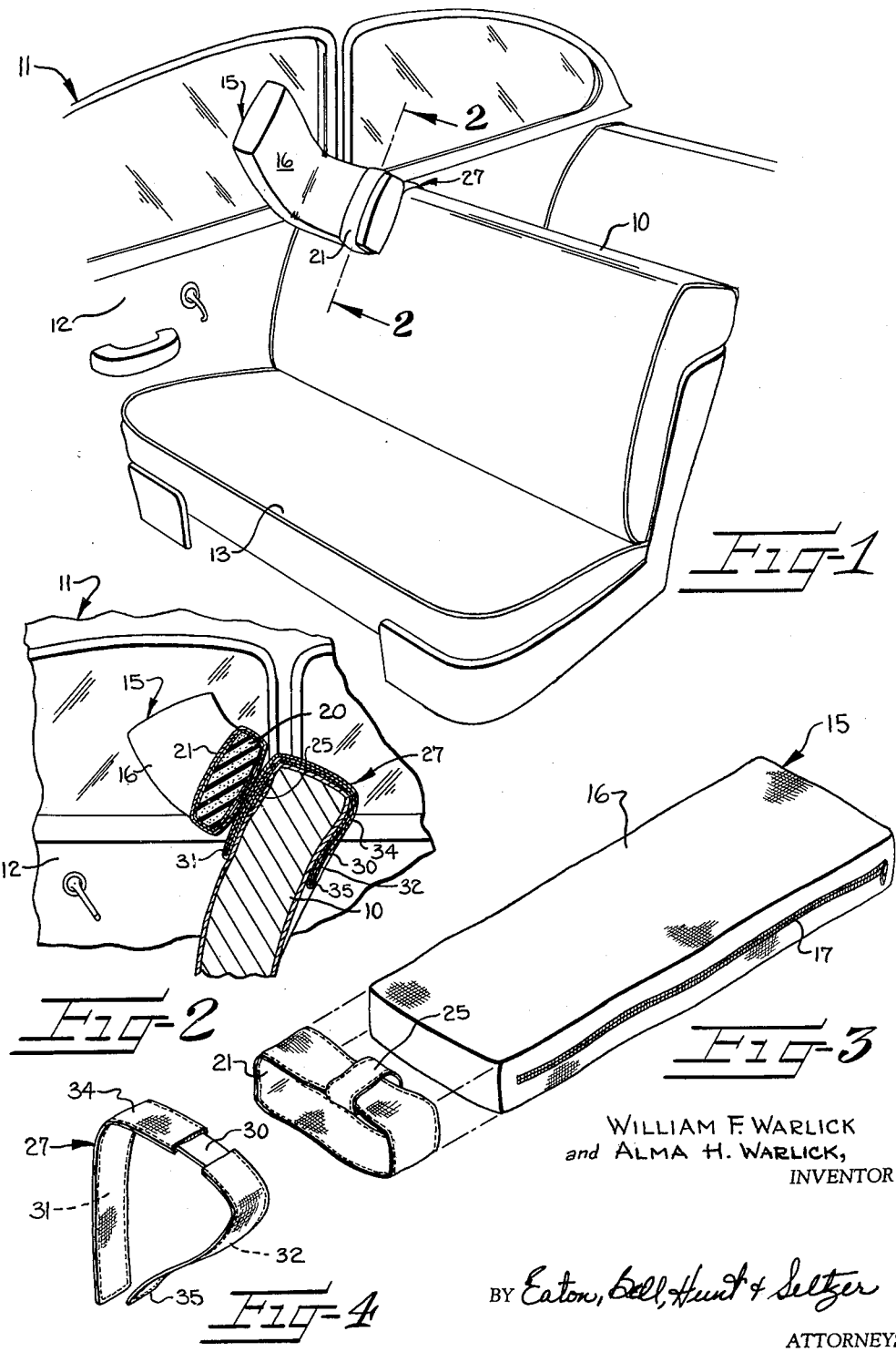

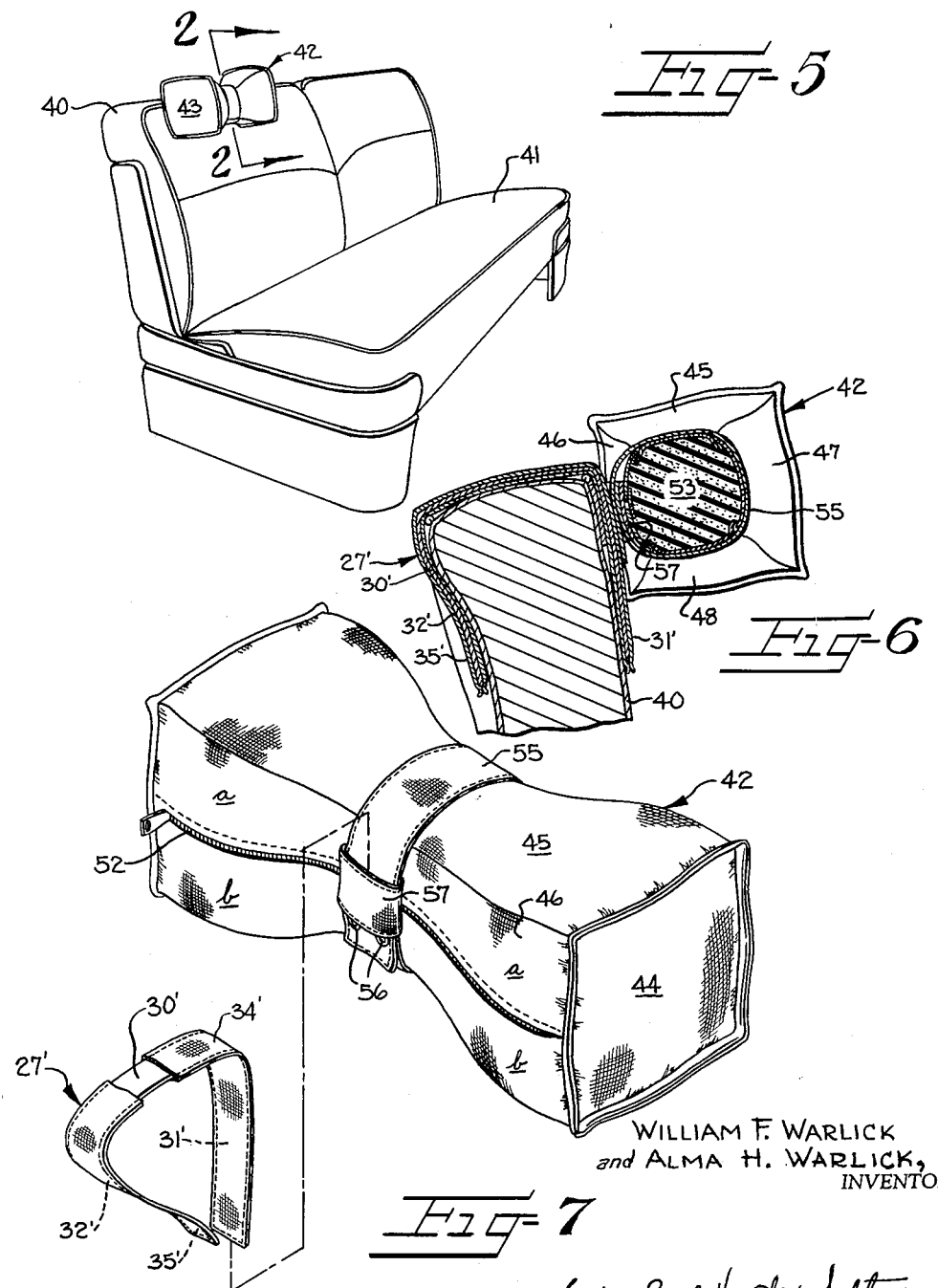

2,983,310
HEADREST FOR UPHOLSTERED SEAT BACK

William F. Warlick and Alma H. Warlick, both of P.O. Box 272, Conover, N.C.

Filed Apr. 16, 1957, Ser. No. 653,085

7 Claims. (Cl. 155—174)

This invention relates to headrests for use with upholstered furniture and the like and, more especially, to a novel headrest cushion and supporting means therefor particularly adapted for use as an attachment to the back of seats in automobiles, buses, trains and the like, to support a person's head in a manner suiting the comfort of the individual using the same.

Many attempts have been made to provide a headrest which is suited to the peculiar needs and desires of each individual user while riding in the upholstered seats of a private or commercial vehicle. To our knowledge, all of such attempts have been confined to forming pillows or cushions of various contours without due consideration being given to the fact that the contour of a cushion which may satisfy one person may not satisfy many others, and what may be comfortable for a person at one time will not necessarily be comfortable for the same person at another time.

It is, therefore, an object of this invention to provide a novel headrest and support therefor capable of being easily attached to and removed from a seat back and being so arranged that the cushion thereof may be adjusted to many different positions relative to the supporting means and in which the supporting means will maintain the cushion in any of such positions in which it may be adjusted.

It is a more specific object of this invention to provide a headrest comprising a cushion, which cushion preferably comprises an enclosure or case having a resilient material therein, such as foam rubber or its equivalent, and wherein the cushion is provided with a band or strap which encircles the cushion and wherein the band is provided with a relatively broad loop thereon through which one of the legs of an inverted substantially U-shaped support or clamp member extends, the clamp member being adapted to be readily secured, through its inherent flexibility, to the upper portion of an upholstered cushion or seat back.

It is another object of this invention to provide a headrest of the character described wherein at least that portion of the leg of the clamp member engaging the forward surface of the seat back is relatively narrow as compared to the length of the loop transversely of the band and loosely extends through said band. Thus, the clamp member maintains the cushion tightly against the forward portion of the seat back and also permits the cushion to be turned to various angular positions relative to the clamp member.

It is a further object of this invention to provide a headrest of the character described wherein the loop member is made from a pliable material, such as fabric, so that it may be distorted somewhat in the event that the comfort of the user requires that the cushion be positioned at a relatively steep angle with respect to the forward leg of the inverted U-shaped member.

It is still another object of this invention to provide a headrest of the character described wherein the clamp is made from a spring material, such as metal and where- in the clamp member is covered with an upholstery material, such as fabric, plastic or the like, so that it will not damage the upholstery on the seat back upon which it is adapted to be mounted.

Some of the objects of the invention having been stated, other objects will appear as the description proceeds when taken in connection with the accompanying drawings in which—

Figure 1 is a perspective view of the seat of an automotive vehicle, showing the interior of one side of the automotive vehicle with one form of the improved headrest mounted on the seat back;

Figure 2 is an enlarged fragmentary vertical sectional view taken substantially along line 2—2 in Figure 1;

Figure 3 is an isometric view of the form of cushion shown in Figure 1 with the band and loop thereof being shown in exploded relation to the cushion;

Figure 4 is an isometric view of the clamp member removed from the cushion;

Figure 5 is a perspective view showing a second form of the improved headrest mounted on the seat back of an automobile seat, sofa or the like.

Figure 6 is an enlarged fragmentary vertical sectional view taken substantially along line 6—6 in Figure 5;

Figure 7 is a partially exploded isometric view of the second form of headrest removed from the seat back.

Although the two forms of the invention disclosed herein are shown in association with the back of the seat of an automotive vehicle, for which purpose it is most particularly applicable, it is to be clearly understood that the improved headrest may be used on the back of any type of seat construction such as a sofa, chair, or the like.

Referring more specifically to the drawings, the first form of the invention is shown in Figures 1 through 4, and is shown in Figures 1 and 2, in particular, in association with an upholstered seat back 10 of an automotive vehicle 11. The numeral 12 indicates a sidewall of the vehicle adjacent which the seat back 10 may be positioned. The side-wall 12 may include a side door or other part of the side-wall of the vehicle as is well known. The usual seat cushion 13 is provided upon which the person sits and whose back normally rests against the seat back 10.

The first form of the improved headrest comprises an elongated or oblong, generally cubically-shaped or box-shaped cushion or pillow broadly designated at 15, which cushion includes an outside covering or housing 16, preferably made from upholstery fabric or other pliable material, and which is provided on one wall thereof with a slide-fastener or other suitable opening and closing means 17. A suitable resilient filler material 20 is provided which fills the casing 16, this resilient material preferably being in the form of so-called foam rubber.

The cushion 15 is snugly encircled by a broad band or strap 21 which preferably is made from a pliable material such as plastic, fabric, or the like, and which is so positioned about the cushion 15 as to facilitate movement of the cushion longitudinally of its axis relative to the band 21 encircling the same. A pliable loop member 25 is carried by the band 21 and preferably loosely encircles the band 21. The loop 25 may be sewed or otherwise secured to the inner surface of the band 21. It will be noted that the width of the loop 25 is substantially the same as, or greater than, the width of the band 21 and the length of the loop; transversely of the band 21 or between the bights thereof, is preferably substantially the same as the width of the band 21. The band 21 may be endless or it may be double-ended with its two ends detachably secured together in the manner of the band 55 of the second form of headrest shown in Figures 5, 6 and 7.

In order to assist in attaching the cushion 15 to the seat back 10 in any desired attitude, an inverted substantially U-shaped clamp member 27 is provided which includes an arcuate bridging portion 30 having an arcuate front leg 31 and a curved leg 32 depending therefrom. The arcuate bridging portion and the legs 31, 32 of the clamp member 27 are preferably enclosed in a suitable upholstery fabric or plastic material 34. With the exception of the material 34, the clamp member 27 is made from a spring-like material, such as spring steel, reinforced plastic material, or the like, and it will be noted that the legs 31, 32 thereof are biased toward each other so they will clampingly engage respective front and rear surfaces of the seat back 10 upon being positioned thereabout as shown in Figure 2. In the instance of the body of the clamp member 27 being made of spring steel it should preferably be coated with a rust-preventive material.

It is preferred that the lower ends of the rear leg 32 of the clamp member 27 be turned outwardly, as at 35 to facilitate ready positioning of the clamp member 27 on an upper portion of the seat back 10. Also, a cushioning tip of leather or other yieldable material may be attached to the free ends of the legs 31, 32 to prevent them from breaking through the fabric enclosure 34. The bridging portion 30 is preferably curved or arcuate as shown in Figures 2 and 4 in order that it may confirm substantially to the contour of the upper edge of the seat back 10.

Although the inverted U-shaped clamp member 27 is shown as being of the same width throughout, it is particularly desirable that the front leg 31 thereof be of substantially the same or lesser width than the width of the band 21 or, at least, than the inside length of the loop 25. The leg 31 loosely extends through the loop 25. Thus, it is apparent that the cushion 21 may be adjusted, not only as to its height or distance from the seat cushion 13, but it may also be turned at various angles relative to the leg 31 of the clamp member 27.

An illustration of a reason why the angularity of the cushion 15 is quite important is given in Figure 1. It is well known that the window or windows of a vehicle may vary as to their position with respect to the seat back 10. Another advantage of the pillow or cushion construction 15 shown in Figure 3 is that it may be turned at right angles intermediate its ends and a portion thereof positioned against the side wall 12 of the vehicle 11 or against a window thereof. Accordingly, it is important that the angle of the cushion 15 relative to the clamp member 27 can be varied to siut the particular desires of the person using the same.

Second form of headrest

Referring to Figures 5, 6 and 7, a second form of headrest is shown which differs from the first form of headrest in the manner in which the pillow or cushion and the strap or band therefor are constructed. In Figure 5 the second form of headrest is shown mounted on an upholstered seat back 40 associated with a seat 41. The seat 41 and the seat back 40 are shown as being of types frequently used as a front seat of an automotive vehicle, although it is to be understood that the second form of headrest may also be used with various other seat constructions, such as upholstered chairs, sofas and the like.

The second form of cushion or pillow is broadly designated at 42 and is of generally hour-glass or dumb-bell shape. The casing of the cushion 42 is preferably made from a suitable fabric or other upholstery material and includes opposed substantially rectangular or square end panels 43 and 44 which are sewed or otherwise secured to opposite ends of interconnected side panels 45, 46, 47 and 48. The side panel 46 is preferably made from two pieces of material a, b sewed together at their opposite end portions and having a suitable fastening means, such as the usual type of slide-fastener arrangement 52, therebetween for detachably connecting the proximal edges of the two sections forming the panel 46 together. The casing of the pillow or cushion 42 contains a soft, yieldable material 53, which material is preferably in the form of so-called foam rubber previously moulded to the desired shape. It is apparent that the slide-fastener means 52 facilitates placing the filler 53 within the casing formed of the panels 43 through 48. It will be observed that each of the panels 45, 46, 47 and 48 is relatively narrow at its central portion, while its opposite ends are of substantially the same width, so the central portion of the pillow or cushion 42 is substantially circular in cross section and is of lesser diameter than the distance across the flats of the rectangular end panels 43, 44. Of course, the end panels 43, 44 may be round or oval-shaped, and of greater diameter than the medial portion of the cushion 42 without departing from the spirit of the invention.

The central portion of the cushion 42 is encircled by a strap member or band 55 made from fabric or other pliable material. In order that the band 55 may snugly encircle a medial portion of the cushion 42 it is preferably double-ended as shown in Figures 6 and 7. Thus, when the band 55 is positioned about the cushion 42 as shown in Figure 7, suitable fastening means 56, such as snap-fasteners, are provided for securing together opposite ends of the band 55 in overlapping relationship. A broad pliable loop member 57, which is also preferably made from fabric or other pliable material, may be secured to either end portion of the band 55 in any suitable manner. It has been found desirable to wrap the loop member 57 around one end of the band 55 and secure the same to the inner surface of the band 55, preferably by suitable stitching, not shown.

The loop member 57 may be of substantially the same width as the lateral width of the band 55 and it will be noted that the fastening means or snap-fasteners 56 are positioned remotely from that free end of the band 55 to which the loop 57 is fastened so as to expose the snap-fasteners 56 whereby the outer overlapping portion of the strap or band 55 loosely extends through the loop 57 and is thus fastened, as shown in Figure 7, with the end of the outer or overlapping portion of the band 55 being exposed beyond the loop 57.

The bracket or clamp member used with the cushion 42, band 55 and loop 57 may be identical to the clamp member 27 shown in Figure 4. According the clamp member shown in Figure 7 will bear the same reference characters as the clamp member 27 shown in Figure 4 with the prime notation added, in order to avoid repetitive description. It is apparent that the leg 31' of the clamp member 27' is loosely encircled by the loop 57 so the cushion 42 may be positioned at various angles relative to the clamp member 27' while the clamp member is attached to the seat back 40 as shown in Figure 6.

Although the loops 25 and 57 in the two embodiments of the invention disclosed herein are preferably made from a pliable non-stretchable material, it is contemplated that they may be made from a pliable resilient material, such as rubber or woven or knit elastic. In this case, the loops 25 and 57 preferably snugly fit on the legs 31, 31' of the respective clamp members 27, 27' under tension and in which case the loops would not be of the same length as, or of greater length than, the width of the legs 31, 31'. Also, the bands 21, 55 may be made from a pliable resilient material, just so long as it will adequately bear the weight of the corresponding cushion. It is also contemplated that the loops 25, 57 may be made from a rigid or semi-rigid material and may be attached to the respective bands 21 and 55 in any desired manner, without departing from the spirit of the invention. For example, a swivel connection may be provided between a rigid loop and a corresponding band, and the band could tightly encircle or confine the legs 31 or 31' of the corresponding clamp member without sacrificing the utility of the novel headrest.

It is thus seen that we have provided a novel headrest construction particularly adapted for use on the back of a seat in a mobile vehicle, such as an automobile, bus, train or the like, which headrest may be readily attached to and detached from such seat back and may be adjusted at practically any desired angle relative to the seat back while being securely retained in the desired adjusted position. It should be noted that, although the leg of the support or clamp member loosely extends through the loop member of each form of the invention, the cushion may be raised or lowered, or turned, relative to the clamp member, and the frictional contact between the clamp member, the loop member and the seat back retains the cushion in the desired adjusted position.

As shown in Figure 1, the cushion 15 has an advantage over the cushion 42 shown in Figures 5, 6 and 7 in that the band 21 may be positioned at any desired location longitudinally of the cushion 15 and the cushion 15 may be bent at its medial portion so that a portion thereof may lie against the side wall of a vehicle, such as side wall 12 of the vehicle 11, and the remaining portion of the cushion may then extend parallel to the seat back 10. On the other hand, the cushion 42 has an advantage over the form of cushion 15 shown in Figures 1, 2 and 3 in that, since its medial portion is of lesser cross-sectional area than its opposite end portions, the medial portion of the cushion 42 forms a recess for holding the person's head in place, without opposite end portions of the cushion covering the ears of the user. This also permits the person's head to be placed against the cushion 42 in any desired position and permits the person's head to sway or move from side to side to a moderate extent with the rolling and swaying of the vehicle in which the occupant may be riding. In other words, the person's head is not clamped rigidly in position by the cushion 42 to where the slightest vibrations of the vehicle would be imparted to the person's head, although the person's head is restrained from lateral movement to a substantial extent.

In the drawings and specification there have been set forth preferred embodiments of the invention and, although specific terms are employed, they are used in a generic and descriptive sense only and not for purposes of limitation, the scope of the invention being defined in the claims.

We claim:

1. A headrest for an upholstered seat back for supporting the head of the user at a slightly forwardly inclined position relative to the body position, said headrest comprising an elongated resilient cushion, a band snugly encircling a medial portion of said cushion, an inverted substantially U-shaped clamp member adapted to fit over, and clampingly engage the front and rear surfaces of the seat back, and means loosely attaching one of the legs of said clamp member to said band in such a manner as to permit rotary adjustment of the cushion about an axis substantially transverse to the longitudinal axis of said cushion.

2. A headrest for an upholstered seat back comprising an elongated resilient cushion, a band encircling a medial portion of said cushion in snug engagement therewith, a substantially U-shaped clamp member including a pair of legs and a bridging portion, means connecting one of said legs to said band, said legs being inherently biased toward each other to thereby tightly engage opposed surfaces of the seat back while the bridging portion extends over the seat back.

3. A headrest for an upholstered seat back, said headrest comprising an elongated resilient cushion, a band snugly encircling a medial portion of said cushion, a loop member carried by and extending transversely of said band, and an inverted substantially U-shaped clamp member adapted to fit over the seat back to clampingly engage front and rear surfaces of the seat back, one of the legs of said clamp member loosely extending through said loop member.

4. A structure according to claim 3 wherein at least said one of the legs of the clamp member is substantially narrower than the length of said loop transversely of said band and wherein the loop is made from a pliable material capable of distortion whereby the headrest may be manually adjusted to various angular positions relative to the clamp member and the seat back.

5. A structure according to claim 3 wherein said band is of double-ended construction, and means for detachably attaching opposite ends of the band together.

6 A structure according to claim 3 wherein one of the legs of said clamp member is of substantially arcuate form and the other of the legs has an inwardly and then outwardly curved lower portion thereon to conform substantially with a seat back.

7. Means for attaching a headrest cushion to a seat back comprising a band encircling said cushion, a loop encircling said band, an inverted substantially U-shaped clamp member adapted to fit over said seat back, at least one of the legs of said clamp member being of lesser width than the distance between the bights of said loop and loosely fitting in said loop, and said loop being made from a pliable material capable of being distorted to thereby facilitate angular adjustment of the cushion relative to the clamp member.

References Cited in the file of this patent

UNITED STATES PATENTS

| 2,081,333 | Hoover | May 25, 1937 |
| 2,522,120 | Kaskey et al. | Sept. 12, 1950 |
| 2,624,397 | St. Aubin | Jan. 6, 1953 |
| 2,638,152 | Pulsifer | May 12, 1953 |

FOREIGN PATENTS

| 694,567 | Great Britain | July 22, 1953 |